(12) United States Patent
Gordon et al.

(10) Patent No.: US 6,519,027 B1
(45) Date of Patent: Feb. 11, 2003

(54) POLARIZATION MODE DISPERSION MEASUREMENT

(75) Inventors: James Power Gordon, Rumson, NJ (US); Robert Meachem Jopson, Rumson, NJ (US); Herwig Werner Kogelnik, Rumson, NJ (US); Lynn E. Nelson, Monmouth Beach, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/520,537

(22) Filed: Mar. 8, 2000

(51) Int. Cl.[7] ............................................. G01N 21/00
(52) U.S. Cl. ....................................................... 356/73.1
(58) Field of Search ................. 356/73.1; 359/124–135, 359/110, 140, 484, 136, 341, 161, 187, 167, 496, 117, 173, 177

(56) References Cited

FOREIGN PATENT DOCUMENTS

EP         0 553 460 A2  *  8/1993

OTHER PUBLICATIONS

P.A. Williams, Modulation phase–shift measurment of PMD, Electronics Letter, Sep. 1999, vol. 35 No. 18.*

* cited by examiner

*Primary Examiner*—Frank G. Font
*Assistant Examiner*—Tu T. Nguyen
(74) *Attorney, Agent, or Firm*—Michael Y. Epstein

(57) ABSTRACT

Four different light signals, all of the same optical frequency, but, having different states of polarization, are transmitted through an optical device and the mean signal delay of each of the light signals is measured. Calculations, based upon the relationship, $\tau_g = \tau_0 - \frac{1}{2} \vec{\Omega} \cdot \vec{s}$, describing the polarization dependence of $\tau_g$ (a measured mean signal delay) through the device as a function of $\tau_0$ (a polarization independent delay component of the device), $\vec{\Omega}$ (the PMD vector at the device input) and $\vec{s}$ (the input Stokes vector of the light signal), yield the PMD of the device. Also, by comparing data taken at adjacent wavelengths, the chromatic dispersion of the optical device can be accurately measured even in the presence of PMD.

15 Claims, 3 Drawing Sheets

POLARIZATION MODE DISPERSION MEASUREMENT

BACKGROUND OF THE INVENTION

This invention relates to optical measurements, and particularly to the measurement of the polarization mode dispersion of optical devices, particularly optical fibers used in telecommunication networks. Although the polarization mode dispersion measurement can be made at a single light wavelength, by making the measurements at plural wavelengths, other optical parameters, e.g., chromatic dispersion, can be determined.

Polarization mode dispersion (PMD) is a distortion mechanism (like chromatic dispersion) that causes optical devices, such as single-mode fibers, optical switches and optical isolators, to distort transmitted light signals. The relative severity of PMD (which is a function of the wavelength of the transmitted light) has increased as techniques for dealing with chromatic dispersion have improved, transmission distances have increased, and bit rates have increased. Negative effects of PMD appear as random signal fading, increased composite second order distortion and increased error rates.

PMD is due to differential group delay caused by geometrical irregularities and other sources of birefringence in the transmission path of the optical device. For example, a single-mode fiber (SMF) is ideally a homogeneous medium supporting only one mode. In practice, it supports two propagation modes with orthogonal polarizations. When a lightwave source transmits a pulse into a SMF cable, the pulse energy is resolved onto the principal states of polarization of the fiber. The two groups of pulse energy propagate at different velocities and arrive at different times causing pulse broadening and signal distortion.

Determining the PMD of in-place (installed) optical fibers is useful for determining the capacity of the fibers for transmitting new telecommunication services of ever increasing bandwidth requirements and for the design and control of PMD compensators. Also, because the PMD of any given fiber can change rapidly with time (owing to random asymmetrical stresses along the length of the fiber), repeated PMD measurements of the fiber can be used in a feedback system for compensating for variable PMD distortions.

The PMD of a fiber is commonly characterized by two specific orthogonal states of polarization called the principal states of polarization (PSPs) and the differential group delay (DGD) between them. This can be described at an optical angular frequency, ω, by the 3-component Stokes vector, $\vec{\Omega} = \Delta\tau \vec{q}$, where $\vec{q}$ is a unit Stokes vector pointing in the direction of the faster PSP, and the magnitude, $\Delta\tau$, is the DGD. Typical DGD values encountered in transmission systems range between 1 (picosecond) ps and 100 ps.

Known methods for determining PMD vectors include the Jones Matrix Eigenanalysis (JME) technique and the Müller Matrix Method (MMM). Each of these techniques uses a tunable, continuous-wave laser and a polarimeter to measure the output polarization states for two (or three) different input polarization launches at two optical frequencies. The PMD vector is then calculated for the midpoint frequency. In addition to determining the output PMD vector, the Müller Matrix Method determines the rotation matrix of the fiber at each frequency and thus the input PMD vector can be calculated.

Shortcomings of these techniques are that they are somewhat difficult to implement, particularly in a feedback system, because they require frequency differentiation of measured data at plural optical frequencies. As described hereinafter, an advantage of the method according to the present invention is that it requires measurements of data at only one optical frequency. Also, while, as hereinafter described, measurements can be made at plural optical frequencies, separate, single frequency measurements are made that do not involve frequency differentiation.

A further advantage of the invention is that it can be used to accurately measure chromatic dispersion of an optical device in the presence of PMD. Other known methods for measuring chromatic dispersion tend to give inaccurate results if the devices have PMD.

SUMMARY OF THE INVENTION

At the input of an optical device, typically an optical fiber link within an optical fiber telecommunications network, four different light signals, all of the same optical frequency, but having different states of polarization, are transmitted along the fiber and the mean signal delay of each of the light signals is measured. By calculation (described hereinafter), the four mean signal delay measurements yield the desired PMD vector of the optical device. Additionally, by repeating the mean signal delay measurement at multiple optical frequencies (i.e., at a different optical frequency for each set of time delay measurements) determination can be made of the first and higher-order intrinsic (polarization-averaged) chromatic dispersion of the device being measured, as well as the higher-order PMD of the device.

DESCRIPTION OF PREFERRED EMBODIMENTS

Figure 1:
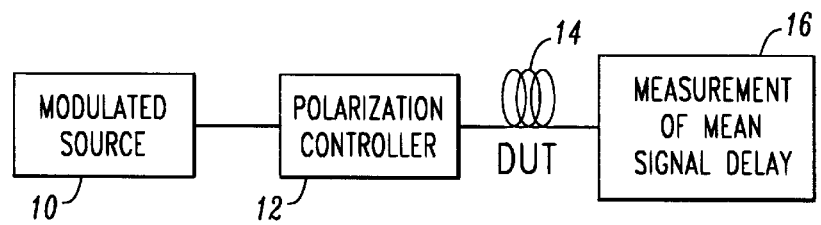
FIG. 1 is a schematic illustration of a system for implementing the present invention.

As above-described, PMD is usually (and herein) described as a three dimensional vector having a magnitude and direction, i.e., having three components. Both an input and an output PMD vector can be determined for any optical device. The PMD vectors are a function of the wavelength of the light transmitted through the device. The present invention involves a new method for making measurements of an optical device and determining the three components of the various PMD vectors. The measurement and calculations made are based upon the known (Mollenauer, L. F. and Gordon, J. P., Optics Lett., Vol. 19, pp. 375–377, 1994) relationship, $$\tau_g = \tau_0 - \tfrac{1}{2}\vec{\Omega}\cdot\vec{s} \tag{1}$$

where $\vec{s}$ and $\vec{\Omega}$ are, respectively, the Stokes vectors of the light and the PMD vector at the fiber input. Equation (1) describes the polarization dependence of the mean signal delay, $\tau_g$, through the fiber as defined by the first moment of the pulse envelope in the time domain with $\tau_0$ being a polarization independent delay component. Eq. (1) assumes that $\tau_0$ and $\vec{\Omega}$ ($\omega$) do not vary significantly over the bandwidth of the signal.

The definition of mean signal delays involving "moments" of the output signals is known and described, for example, in the afore-cited publication by Mollenauer and Gordon as well as by Elbers, J. P., et al, "Modeling of Polarization Mode Dispersion in Single Mode Fibers," Electr. Lett., Vol. 33, pp. 1894–1895, October 97; Shieh, W., "Principal States of Polarization for an Optical Pulse," IEEE Photon. Technol. Lett; Vol. 11, No. 6, p. 677, June 99; and Karlsson, M., "Polarization Mode Dispersion-Induced Pulse Broadening in Optical Fibers," Opt.

Lett., Vol. 23, pp. 688–690, '98.

More precisely, mean signal delay, $\tau_g$, is expressed as the difference of the normalized first moments at fiber output and input, $$\tau_g = \frac{W_1(z) - W_1(0)}{W}, \quad (2)$$

where z is the distance of propagation in the fiber. Here $W = \int dt\ \vec{E}\dagger\vec{E} = \int d\omega \tilde{E}\dagger\tilde{E}$ is the energy of the signal pulse represented by the complex field vector $\vec{E}(z,t)$ with Fourier transform $\tilde{E}(z,\omega)$, and $W_1(z) = \int dt\, t\vec{E}\dagger\vec{E} = j\int d\omega \tilde{E}\dagger\tilde{E}_\omega$ is the first moment.

Because, in equation (1), there are four unknowns, i.e., $\tau_0$ (fiber intrinsic group delay) and the three components of the PMD input vector, $\vec{\Omega}$, four measurements are necessary to determine $\vec{\Omega}$ and $\tau_0$ at a given wavelength. Each set of measurements comprises launching a set of four light signals of respectively different polarization states into the fiber and measuring the mean signal delay of each of the signals by known means.

A variety of different light polarization states can be used, but for simplicity of the mathematical analysis, a convenient set of polarization states are those coinciding with the Poincaré sphere axes, $\hat{S}_1, -\hat{S}_1, \hat{S}_2$, and $\hat{S}_3$, i.e., three different linear Polarization states and a circular polarization state. (A "Poincaré sphere" being a graphical representation of all possible Polarization states on a surface of a sphere where each point on the sphere represents a different polarization form; see, for example, W. Shurcliff, *Polarized Light: Production and Use*, p. 16, Harvard University Press, Cambridge, Mass., 1962. A specific example of selected polarization states is provided hereinafter.)

By identifying the measured mean signal delays for each polarized state as $\tau_{g1}, \tau_{(-1)}, \tau_{g2}$, and $\tau_{g3}$ respectively, the calculated components from equation (1) are as follows:

$$\tau_0 = \tfrac{1}{2}(\tau_{g1} + \tau_{g(-1)}) \quad (3)$$

and the three components of the fiber input PMD Stokes vector $\vec{\Omega}$ are:

$$\Omega_1 = 2(\tau_0 - \tau_{g1})$$

$$\Omega_2 = 2(\tau_0 - \tau_{g2})$$

$$\Omega_2 = 2(\tau_0 - \tau_{g3}) \quad (4)$$

(Described hereinafter is how the above mathematical relationships, for the "special" Poincaré sphere axial polarizations, can be generalized to any four non-degenerate input polarization states.)

As above-described, implementation of the present invention involves the launching of a set of different test light signals into a device under test, e.g., an optical fiber, and measuring the mean signal delay for each signal.

The basic technique according to the invention is illustrated in FIG. 1, which shows a test system including a source 10 of modulated light at a single optical frequency and a polarization controller 12 for adjusting the polarization of the light from the source 10 to four successively different polarization states which are successively introduced into and transmitted through an optical device 14 under test, e.g., a length of optical fiber wound on a coil. The light signals exiting the test device 14 are successively fed into an apparatus 16 for measuring the mean signal delay for each test signal transmitted through the device. The measured data provides, by equations (3) and (4), the polarization independent delay and the input PMD Stokes vector of the device under test at a single optical frequency. The measurements are repeated at successively different optical frequencies for determining the frequency dependence of these factors. Also, the data taken at multiple frequencies allows the determination of the chromatic dispersion of the device under test. This is described hereinafter.

As noted, the system shown in FIG. 1 measures the PMD vector at the input to the optical device 14. An advantage of the system shown in FIG. 1, in comparison with the prior mentioned known Jones (JME) and Müller (MMM) techniques for measuring input PMD vectors, is that no output polarimeter is required. Conversely, if the output from the optical device is passed into a polarimeter, the rotation matrix of the optical device, $R(\omega)$, can be determined. Then the PMD vector at the output of the optical device, $\vec{\Omega}_f(\omega)$, can be determined from $$\vec{\Omega}_f(\omega) = R(\omega)\vec{\Omega}(\omega), \quad (5)$$

where $\vec{\Omega}(\omega)$ is the input PMD vector from eq. (4). For instance, for the previously mentioned launches coinciding $\hat{S}_1, -\hat{S}_1, \hat{S}_2$, and $\hat{S}_3$, the matrix $R(\omega)$ is given by $$R(\omega) = \begin{vmatrix} T_{11} & T_{21} & T_{31} \\ T_{12} & T_{22} & T_{32} \\ T_{13} & T_{23} & T_{33} \end{vmatrix} \quad (6)$$

where $T_{1j}, T_{2j}$, and $T_{3j}$ (j=1, 2, 3) are the jth components of the output Stokes vectors measured by the polarimeter for launches $\hat{S}_1, \hat{S}_2$, and $\hat{S}_3$, respectively.

Figure 2:
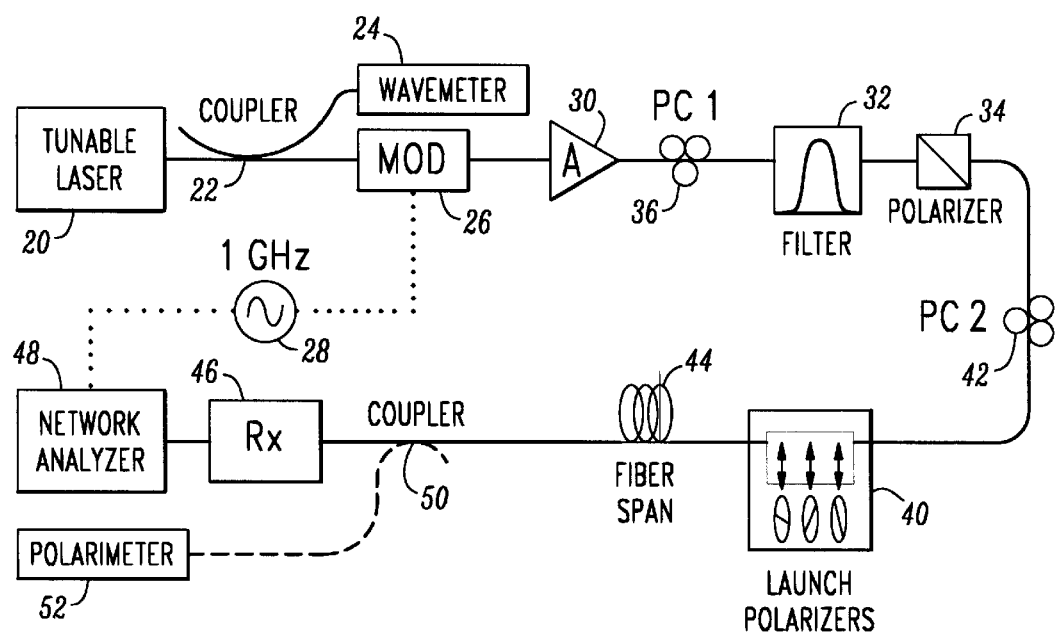
FIG. 2 is similar to FIG. 1 but showing a more specific example of a suitable system for implementing the invention.

Apparatus for performing each of the functions indicated in FIG. 1 are generally known, and different specific arrangements for practicing the invention can be devised by persons of skill. FIG. 2 shows but one example of an arrangement useful for implementing the invention.

Light of a desired wavelength is provided by a wavelength tunable laser 20 (Hewlett-Packard 81682A). A directional coupler 22 (Etek SWBC2201PL213) splits the light from the laser into two parts, one of which enters a wavemeter 24 (Hewlett-Packard 86120B) that measures the wavelength of the light, the other of which is coupled to an optical modulator (MOD) 26 (Lucent Technologies X2623C). An electrical signal from an oscillator 28 (1 GHz) (part of Hewlett-Packard 83420A) is also connected to the modulator. The optical modulator imposes a sinusoidal modulation on the optical power of the light. This modulated signal is amplified by an optical amplifier (A) 30 (Lucent Technologies W1724CDDAD), passed through a tunable optical filter 32 (JDS Fitel TB 1500B) tuned to the wavelength of the signal and enters a linear polarizer 34 (Etek FPPD2171LUC02). A polarization controller (PC1) 36 (Fiber Control Industries FPC-1) is used to adjust the polarization of the signal so that it nearly matches the polarization of the linear polarizer 34. This polarizer 34, which is not essential to the measurement, serves to make the results of the measurement insensitive to polarization changes occurring in the components and in the fiber preceding the polarizer. After the polarizer 34, the signal passes though a launch polarizer box 40. This box 40, which functions by switching polarizers into or out of the signal path, selectively modifies the signal polarization from its input polarization to one of four output polarization states.

Three of those states are provided by putting an appropriate polarizer in the beam path while the fourth state is provided by switching all of the polarizers out of the beam path and using the input signal polarization unmodified. This input polarization can be adjusted to a desired state using polarization controller (PC2) 42 (Fiber Control Industries FPC-1). Alternatively, the fourth polarization could be provided by a fourth switchable polarizer in launch polarizer box 40. After passing through the launch polarizer box 40, the signal is launched into the device under test, shown here as a fiber span 44. After the fiber span, the signal, now modified by the PMD of the fiber span, enters a receiver 46 (part of Hewlett-Packard 83420A) which generates an electrical signal with a voltage proportional to the power in the optical signal. A network analyzer 48 (Hewlett-Packard 8753D) measures the difference between the phase of the signal provided by the oscillator 28 and the phase of the amplitude modulation of the received signal. Prior to entering the receiver 46, the signal can optionally be tapped using a directional coupler 50 (Etek SWBC2210PL213) and the tapped light sent to a polarimeter 52 (Hewlett-Packard 8509B). This polarimeter 52, which is not needed for the inventive measurement techique, is used in the measurement of PMD by a prior technique such as the Müller Matrix Method. This allows comparison of the results obtained by the different techniques. The polarimeter 52 is also convenient when setting the polarization controller 42 to a desired state.

An example of measurements made according to the invention using the apparatus shown in FIG. 2 follows.

Four polarization states (linear polarization states at 0°, 60° and 120°, and a circular polarization state) were launched into a 52-km optical fiber span having a known average PMD of 35 ps and a chromatic dispersion of approximately −6 ps/nm at 1555 nm.

Figure 3:
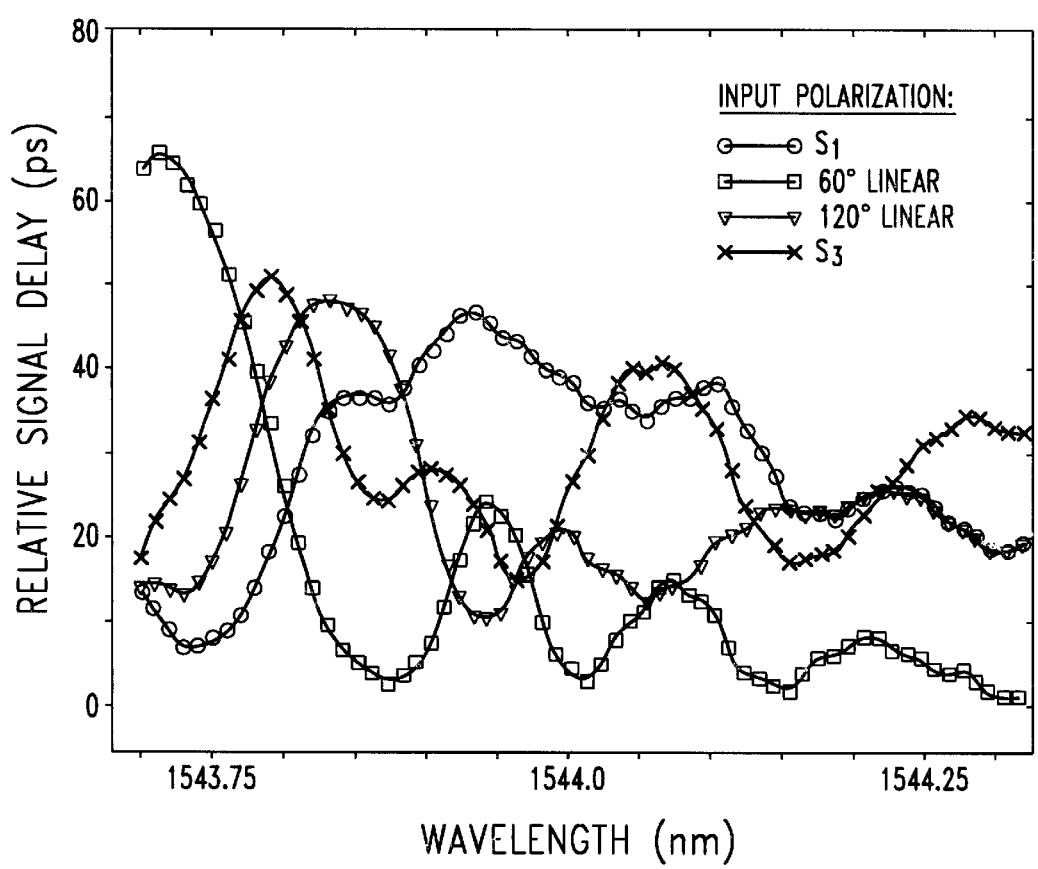
FIG. 3 is a graph showing the wavelength dependence of the signal delay of each of four fixed input polarization signals transmitted through a single mode fiber.

FIG. 3 shows the signal delays (vertical axis) for each input polarization as a function of light wavelength (horizontal axis). (Because the intrinsic signal delays through the 52-km fiber span are about 260 µs, "relative" signal delays are plotted in FIG. 3 where a constant delay has been subtracted from the actual measured delays.) The PMD of the fiber span causes the polarization dependence of the signal delay at each wavelength, and the variations in those relative signal delay curves originate from the change of direction and magnitude of $\vec{\Omega}(\omega)$ as well as from underlying chromatic dispersion.

Figure 4:
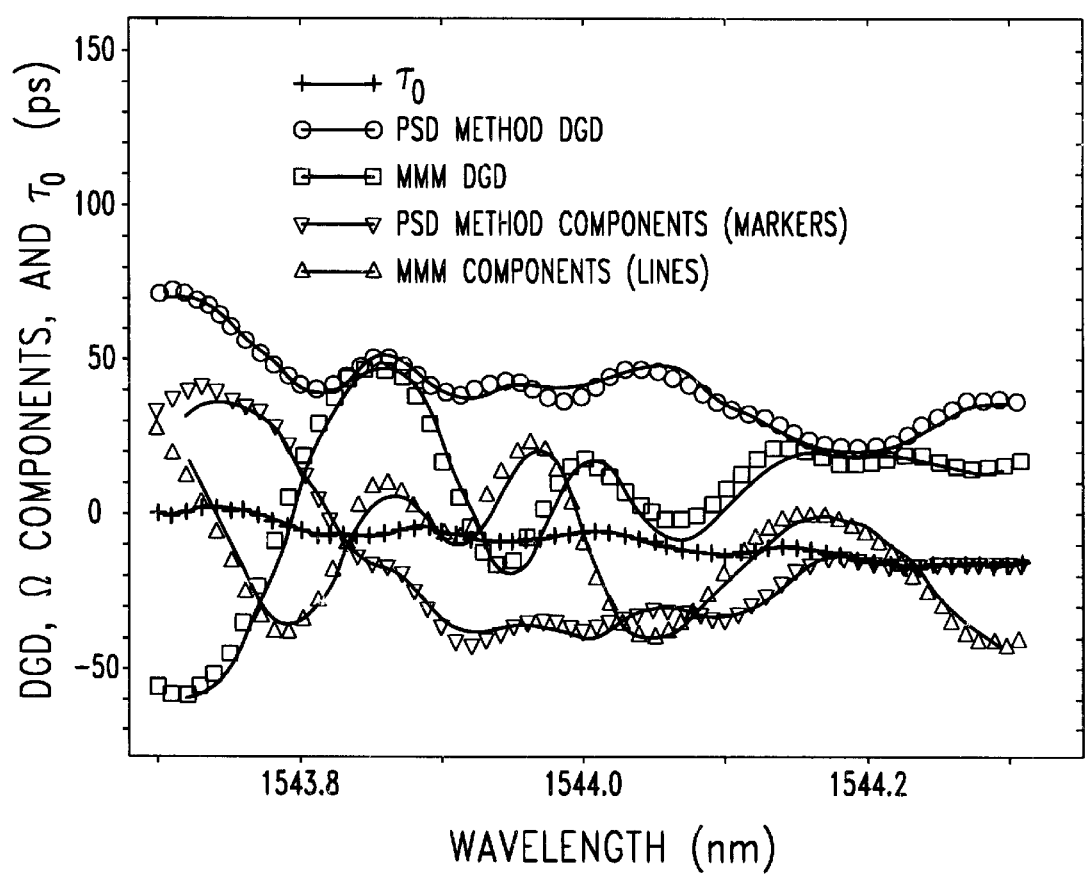
FIG. 4 is a graph showing the wavelength dependence of the input PMD vector of the fiber obtained using the data of FIG. 3.

FIG. 4 shows the input PMD vector $\vec{\Omega}(\omega)$ and the relative 263 polarization-independent delays, $\tau_0$, for this fiber, determined from the data of FIG. 3. Here, $\tau_0$ is the polarization-independent delay through the fiber span at each wavelength compared to the delay at the first wavelength, 1543.70 nm. The modulation frequency was 1 GHz, providing $\omega_m$ $\Delta\tau$=0.45 at the maximum DGD, where here $\omega_m$ is $2\pi$ times the modulation frequency. FIG. 4 also shows data for the determination of the chromatic dispersion of the test fiber 44 (FIG. 2). Chromatic dispersion is the change in the intrinsic (polarization-averaged) group delay $\tau_0$ through an optical device with wavelength. For instance, if measurements are taken at two wavelengths, $\lambda_1$ and $\lambda_2$, the chromatic dispersion D at the average of these wavelengths, $(\lambda_1+\lambda_2)/2$, can be obtained by dividing the change in $\tau_0$ by the change in wavelength:

$$D[(\lambda_1 + \lambda_2)/2] = \frac{\tau_0(\lambda_2) - \tau_0(\lambda_1)}{\lambda_2 - \lambda_1} \tag{7}$$

In FIG. 4, the chromatic dispersion of the fiber corresponds to the slope of the curve plotting $\tau_0$ versus wavelength. For example, at a wavelength of 1544.0, the dispersion is 73.3 ps/nm.

Also shown in FIG. 4 is a measurement of the input $\vec{\Omega}(\omega)$ on the same fiber using the aforementioned Müller Matrix Method for determining PMD vectors. The data for the Müller method was taken immediately before the measurement according to the present invention. The two techniques agree to within a maximum discrepancy of 7 ps.

While it is convenient to launch the specific polarization states, $\hat{S}_1, -\hat{S}_1, \hat{S}_2$, and $\hat{S}_3$, as previously noted, equations (3) and (4) can be generalized to any four non-degenerate input polarization launches $\hat{S}_i$ (i=1,2,3,4) that span Stokes space. The corresponding signal delay measurements, $\tau_{gi}$, can be grouped into a four-dimensional (4-D) vector $\bar{\tau}_g=(\tau_{g1},\tau_{g2},\tau_{g3},\tau_{g4})$, and similarly, the desired delay components can be grouped into a 4-D vector $\bar{\tau}_g=(\tau_0,\Omega_1,\Omega_2,\Omega_3)$. The four launches together with Eq. (1) set up the required four linear equations for the four unknowns represented by $\bar{\tau}$, yielding $\bar{\tau}_g=P\bar{\tau}$, where P is a 4×4 matrix he components of the launched polarizations.

$$P = \frac{1}{2}\begin{vmatrix} 2 & -S_{11} & -S_{12} & -S_{13} \\ 2 & -S_{21} & -S_{22} & -S_{23} \\ 2 & -S_{31} & -S_{32} & -S_{33} \\ 2 & -S_{41} & -S_{42} & -S_{43} \end{vmatrix} \tag{8}$$

Here $S_{ij}$ is the jth component of polarization launch $\vec{S}_i$. The equivalent of Eqs. (3) and (4) is then $\bar{\tau}=P^{-1}\bar{\tau}_g$, and so $\tau_0$ and the vector components of $\vec{\Omega}$ can be determined by inverting the matrix P at each frequency of interest.

For this general launch case, Eq. (5) can also be used to determine the output PMD vector when a polarimeter is inserted at the output. In order to determine the rotation matrix of the fiber, $R(\omega)$, any two of the four non-degenerate input launches $\vec{S}_i$ can be used. We use $\vec{S}_a$ and $\vec{S}_b$ to designate the two chosen input launches, and $\vec{T}_a$ and $\vec{T}_b$ as the corresponding measured output Stokes vectors. We first create a set of three orthogonal vectors at the input, $\hat{S}_1', \hat{S}_2'$, and $\hat{S}_3'$, where $\hat{S}_1'=\vec{S}_a$, $\hat{S}_3'=\vec{S}_a\times\vec{S}_b/|\vec{S}_a\times\vec{S}_b|$, and $\hat{S}_2'=\hat{S}_3'\times\hat{S}_1'$. Similarly we create a set of three orthogonal vectors at the output, $\hat{T}_1', \hat{T}_2'$, and $\hat{T}_3'$, where $\hat{T}_1'=\vec{T}_a$, $\hat{T}_3'=\vec{T}_a\times\vec{T}_b/|\vec{T}_a\times\vec{T}_b|$, and $\hat{T}_2'=\hat{T}_3'\times\hat{T}_1'$. The rotation matrix of the fiber is then $R=R_T R_S$, where $$R_S = \begin{vmatrix} S'_{11} & S'_{12} & S'_{13} \\ S'_{21} & S'_{22} & S'_{23} \\ S'_{31} & S'_{32} & S'_{33} \end{vmatrix} \quad (9)$$

and $$R_T = \begin{vmatrix} T'_{11} & T'_{21} & T'_{31} \\ T'_{12} & T'_{22} & T'_{32} \\ T'_{13} & T'_{23} & T'_{33} \end{vmatrix}. \quad (10)$$

Here $S_{1j}'$, $S_{2j}'$, and $S_{3j}'$ (j=1, 2, 3) are respectively the jth components of the set of three orthogonal vectors at the input, $\hat{S}_1'$, $\hat{S}_2'$, and $\hat{S}_3'$, while $T_{1j}'$, $T_{2j}'$, and $T_{3j}'$ (j=1, 2, 3) are respectively the jth components of the set of three orthogonal vectors at the output, $\hat{T}_1'$, $\hat{T}_2'$, and $\hat{T}_3'$.

Instead of determining moments from pulse-shape measurements, the signal delays, $\tau_{gi}$, can also be obtained (in approximation, i.e., to an acceptable degree of accuracy, e.g., 6% as described hereinafter) by observing phase shifts of the modulation of a sinusoidal amplitude modulated signal and benefiting from the precision of sensitive phase-detection techniques. (Note that Williams [Electron. Lett. Vol. 35, pp. 1578–1579, 1999] has used sinusoidal modulation for the determination of the scalar DGD.) For most purposes, it suffices to only measure changes in $\tau_{gi}$ with polarization and optical frequency and to not resolve the ambiguity presented by the use of a signal with periodic modulation. For a sinusoidal intensity-modulated signal with the assumption of frequency-independent PSP's and DGD, Eq. (1) becomes $$\tan \omega_m(\tau_g - \tau_0) = -\vec{q} \cdot \vec{s} \tan(\omega_m \Delta \tau/2), \quad (11)$$

where $\omega_m$ is the angular modulation frequency. When the four launch polarizations coincide with the Poincaré sphere axes, $\hat{S}_1, -\hat{S}_1, \hat{S}_2$, and $\hat{S}_3$, Eq. (3) is still valid for sinusoidal modulation: $\tau_0 = \frac{1}{2}(\tau_{g1} + \tau_{g(-1)})$. Using the relation $q_1^2 + q_2^2 + q_3^2 = 1$, expressions for the magnitude, $\Delta \tau$, and components, $q_i$, of the unit vector, $\vec{q}$, pointing in the direction of the PMD vector, $\vec{\Omega}$, can also be determined and solved exactly.

In the more general case we can use any four non-degenerate input polarization launches $\vec{s}_i$ (i=1, a, b, c) that span Stokes space, where $\vec{s}_1 = \hat{S}_1$, $\vec{a}_a = (a_1, a_2, a_3)$, $\vec{s}_b = (b_1, b_2, b_3)$, and $\vec{s}_c = (C_1, C_2, C_3)$, and measure the corresponding delays $\tau_{g1}, \tau_{ga}, \tau_{gb}$, and $\tau_{gc}$. We first express $\hat{S}_1, \hat{S}_2$, and $\hat{S}_3$, in terms of $\vec{S}_a, \vec{S}_b$, and $\vec{S}_c$, $$\hat{S}_i = \alpha_i \vec{s}_a + \beta_i \vec{s}_b + \gamma_i \vec{s}_c \, (i=1,2,3), \quad (12)$$

where the coefficients $\alpha_i$, $\beta_i$, and $\gamma_i$ are obtained from $$\begin{vmatrix} \alpha_1 & \beta_1 & \gamma_1 \\ \alpha_2 & \beta_2 & \gamma_2 \\ \alpha_3 & \beta_3 & \gamma_3 \end{vmatrix} = \begin{vmatrix} a_1 & a_2 & a_3 \\ b_1 & b_2 & b_3 \\ c_1 & c_2 & c_3 \end{vmatrix}^{-1} \quad (13)$$

Substituting $\hat{S}_1 = \alpha_1 \vec{s}_a + \beta_1 \vec{s}_b + \gamma_1 \vec{s}_c$ into Eq. (11) gives $$\tan \omega_m(\tau_{g1} - \tau_0) = -\vec{q} \cdot (\alpha_1 \vec{s}_a + \beta_1 \vec{s}_b + \gamma_1 \vec{s}_c) \tan(\omega_m \Delta \tau/2), \quad (14)$$

leading to a transcendental equation for $\tau_0$:

$$\tan\omega_m(\tau_{g1} - \tau_0) = \alpha_1 \tan\omega_m(\tau_{ga} - \tau_0) + \beta_1 \tan\omega_m(\tau_{gb} - \tau_0) + \gamma_1 \tan\omega_m(\tau_{gc} - \tau_0). \quad (15)$$

A first trial value for $\tau_0$ can be obtained by linearizing Eq. (15), $$\tau_0 = \frac{\tau_{g1} - \alpha_1 \tau_{ga} - \beta_1 \tau_{gb} - \gamma_1 \tau_{gc}}{1 - \alpha_1 - \beta_1 - \gamma_1} \quad (16)$$

After solving for $\tau_0$ and using $q_1^2 + q_2^2 + q_3^2 = 1$, an expression for the magnitude, $\Delta \tau$, can be found:

$$\tan^2(\omega_m \Delta \tau / 2) = \quad (17)$$
$$\sum_i [\alpha_i \tan\omega_m(\tau_{ga} - \tau_0) + \beta_i \tan\omega_m(\tau_{gb} - \tau_0) + \gamma_i \tan\omega_m(\tau_{gc} - \tau_0)]^2.$$

The components, $q_i$, of the PMD vector, $\vec{\Omega}$, can then be determined from $$-q_i = \frac{\alpha_i \tan\omega_m(\tau_{ga} - \tau_0) + \beta_i \tan\omega_m(\tau_{gb} - \tau_0) + \gamma_i \tan\omega_m(\tau_{gc} - \tau_0)}{\tan(\omega_m \Delta \tau / 2)}. \quad (18)$$

Although the above procedure will yield any computational accuracy desired, it is often not necessary. For small modulation frequencies, $\omega_m$, we can approximate tan (x)≅x in Eq. (11), reducing to the earlier expressions (i.e. Eqs. (3) and (8)). These linear expressions are valid for sinusoidal modulation to within 6% as long as $\omega_m \Delta \tau < \pi/4$. For instance, for the peak DGD we observed here, 70 ps, 6% accuracy will be obtained for modulation frequencies, fm=$\omega$m/$2\pi$, less than 1.8 GHz by using the linear expressions.

As above-explained, the inventive method involves multiple launchings of different polarized light states, determining the mean signal delays of the different polarization states, and calculating the PMD vectors. Basic techniques for measuring the group delay of an optical device are known, see, e.g., Y. Horiuchi, et al., "Chromatic Dispersion Measurements of 4564 km Optical Amplifier Repeater System," Electronics Letters, Vol. 29, pp. 4–5, Jan. 7, 1993. Additionally, by comparing data taken at adjacent wavelengths with the inventive method, chromatic dispersion of optical devices can be accurately measured even with the presence of PMD.

What is claimed is:

1. A method of measuring the polarization mode dispersion (PMD) at a first optical frequency of an optical device comprising launching at an input of said device at least four test light signals at said first frequency but at respectively different polarization states that span Stokes space, measuring, at an output of said device, the mean signal delay of each of said test signals, and calculating a three-component Stokes vector describing the PMD of said device at said input.

2. A method according to claim 1 wherein the calculation is based upon the formula:

$$\tau_g = \tau_0 - \tfrac{1}{2} \vec{\Omega} \cdot \vec{s} \quad (1)$$

where $\vec{s}$ is the input Stokes vector of a light signal transmitted through the device, $\vec{\Omega}$ is the input PMD vector for the device at the optical frequency of the light signal, $\tau_g$ is the mean signal delay, and $\tau_0$ is the intrinsic group delay of the device.

3. A method according to claim 2 including determining, at said device output, the polarization state of each test light signal for determining the PMD of said device at said output thereof.

4. A method according to claim 3 including using at least two of said test signals of known polarization state for determining the rotation matrix of said device.

5. A method according to claim 4 wherein the measuring of the mean signal delays is accomplished in approximation by measuring phase delays of sinusoidally modulated signals.

6. A method according to claim 3 wherein the measuring of the mean signal delays is accomplished in approximation by measuring phase delays of sinusoidally modulated signals.

7. A method according to claim 2 wherein said four polarization states are those coinciding with the axes $\hat{S}_1, -\hat{S}_1, \hat{S}_2$, and $\hat{S}_3$ of a Poincaré sphere representation of all possible light polarization states and wherein the calculated components of formula (1) are $$\tau_0 + \tfrac{1}{2}(\tau_{g1} + \tau_{g(-1)})$$

and the three components of said Stokes vector are:

$$\Omega_1 = 2(\tau_0 - \tau_{g1})$$
$$\Omega_2 = 2(\tau_0 - \tau_{g2})$$
$$\Omega_3 = 2(\tau_0 - \tau_{g3})$$

where $\tau_{g1}, \tau_{g(-1)}, \tau_{g2}$ and $\tau_{g3}$ are the respective measured mean signal delays for said test light signals.

8. A method according to claim 7 wherein the measuring of the mean signal delays is accomplished in approximation by measuring phase delays of sinusoidally modulated signals.

9. A method according to claim 2 wherein said calculation includes the steps of
  i. determining matrix P given by $$P = \frac{1}{2} \begin{vmatrix} 2 & -S_{11} & -S_{12} & -S_{13} \\ 2 & -S_{21} & -S_{22} & -S_{23} \\ 2 & -S_{31} & -S_{32} & -S_{33} \\ 2 & -S_{41} & -S_{42} & -S_{43} \end{vmatrix}$$

the $S_{ij}$ is the jth component of polarization launch $\vec{S}_i$,
  ii. determining the inverse, $P^{-1}$, of matrix P, and
  iii. determining the four components of the vector $\bar{\tau} = (\tau_0, \Omega_1, \Omega_2, \Omega_3)$ where $\Omega_i$ is the ith component of the PMD vector $\vec{\Omega}$ from $\bar{\tau} = P^{-1} \bar{\tau}_g$, where $\bar{\tau}_g$ is a four-component vector formed from the four measured of the mean signal delays.

10. A method according to claim 9 wherein the measuring of the mean signal delays is accomplished in approximation by measuring phase delays of sinusoidally modulated signals.

11. A method according to claim 2 wherein the measuring of the mean signal delays is accomplished in approximation by measuring phase delays of sinusoidally modulated signals.

12. A method according to claim 1 wherein the measuring of the mean signal delays is accomplished in approximation by measuring phase delays of sinusoidally modulated signals.

13. A method according to claim 12 wherein the calculation is based on the formula:

$$\tan \omega_m (\tau_g - \tau_0) = -\vec{q} \cdot \vec{s} \tan(\omega_m \Delta \tau / 2)$$

where $\omega_m$ is the angular modulation frequency, $\vec{q}$ is a unit vector pointing in the direction of the input polarization-mode-dispersion (PMD) vector, $\Delta \tau$ is the magnitude of the PMD vector, $\tau_g$ is the mean signal delay as measured by the phase of a sinusoidally modulated signal, $\tau_0$ is the intrinsic group delay of the device, and $\bar{s}$ is the input Stokes vector of a light signal transmitted through the device.

14. A method according to claim 13 including determining, at said device output, the polarization state of each test light signal for determining the PMD of said device at said output thereof.

15. A method according to claim 14 including using at least two of said test signals of known polarization state for determining the rotation matrix of said device.

* * * * *